United States Patent
Park et al.

(10) Patent No.: US 7,492,422 B2
(45) Date of Patent: Feb. 17, 2009

(54) LIQUID CRYSTAL DISPLAY DEVICE

(75) Inventors: Young Woo Park, Seoul (KR); Oh In Ja, legal representative, Seoul (KR); Young Kwang Ha, Jinji-shi (KR)

(73) Assignee: LG Display Co., Ltd., Seoul (KR)

( * ) Notice: Subject to any disclaimer, the term of this patent is extended or adjusted under 35 U.S.C. 154(b) by 239 days.

(21) Appl. No.: 10/952,712

(22) Filed: Sep. 29, 2004

(65) Prior Publication Data
US 2005/0110916 A1 May 26, 2005

(30) Foreign Application Priority Data
Nov. 10, 2003 (KR) ...................... 10-2003-0079111

(51) Int. Cl.
*G02F 1/1333* (2006.01)
(52) U.S. Cl. .......................... 349/58; 349/40
(58) Field of Classification Search ............. 349/58–60, 349/192, 54, 65, 40
See application file for complete search history.

(56) References Cited

U.S. PATENT DOCUMENTS

| | | | | |
|---|---|---|---|---|
| 4,250,572 A | * | 2/1981 | Yoshida | 368/71 |
| 5,870,160 A | * | 2/1999 | Yanagawa et al. | 349/141 |
| 6,147,724 A | * | 11/2000 | Yoshii et al. | 349/62 |
| 6,583,831 B2 | * | 6/2003 | Kim | 349/58 |

FOREIGN PATENT DOCUMENTS

| | | | |
|---|---|---|---|
| CN | 1383059 | | 12/2002 |
| JP | 55-062426 | * | 5/1980 |
| JP | 10-232621 | | 9/1998 |
| JP | 2000-036668 | * | 2/2000 |
| JP | 2000-148028 | | 5/2000 |

OTHER PUBLICATIONS

Office Action dated Mar. 30, 2007 for corresponding Chinese Patent Application No. 2004100886451.
Examiner's Office Letter for corresponding Japanese Patent Application Ser. No. 2004-324628, dated Nov. 19, 2007.
Office Action issued in corresponding Japanese Patent Application No. 2004-324628; mailed May 12, 2008.

* cited by examiner

*Primary Examiner*—Thoi V Duong
(74) *Attorney, Agent, or Firm*—Brinks Hofer Gilson & Lione

(57) ABSTRACT

A liquid crystal display device includes a liquid crystal display panel and a backlight unit. A case top covers edges of the liquid crystal display panel. At least one resilient metallic member contacts a portion of the case top as well as an upper glass substrate of the liquid crystal display panel and a plastic support main on which the liquid crystal display panel is supported and into which the backlight unit is fit. The resilient metallic member grounds the liquid crystal display panel to the case top, thereby preventing static electricity from damaging the liquid crystal display panel.

11 Claims, 6 Drawing Sheets

LIQUID CRYSTAL DISPLAY DEVICE

CLAIM FOR PRIORITY

This application claims the benefit of Korean Application No. P2003-79111, filed on Nov. 10, 2003, which is hereby incorporated by reference as if fully set forth herein.

BACKGROUND

1. Technical Field

The present invention relates to liquid crystal display devices, and more particularly, to a liquid crystal display device which is suitable for removing static electricity from a liquid crystal display panel.

2. Related Art

Referring to FIGS. 1 and 2, a conventional liquid crystal display device has a reflective plate 42, a light guiding plate 44, multiple optical sheets 46 stacked on the light guiding plate 44, a liquid crystal display panel 48 containing opposing substrates on which polarizers 40a and 40b are disposed, a plastic support main 34 supporting the liquid crystal display panel 48, and a case top 32 and case bottom 36 surrounding the support main 34 and edges of the liquid crystal display panel 48.

The liquid crystal display device also uses conductive tape 38 with copper or aluminum on one surface. The metal surface of the conductive tape 38 contacts the top glass substrate of the liquid crystal display panel 48, the support main 34, and the case bottom 36 while the adhesive portion of the conductive tape 38 is attached to the case top 32. The conductive tape 38 permits discharge of static electricity from the liquid crystal display panel 48 to the case top 32.

However, problems occur due to defective attachment of the conductive tape during mass production of the liquid crystal display devices. The conductive tape attached to the liquid crystal display panel has a narrow area. Additionally, during fabrication the conductive tape is subjected to a high temperature and vibration, which weakens the adhesive force of the narrow conductive tape and causes it to peel off the liquid crystal panel. The peeling of the conductive tape off the liquid crystal display panel causes defective grounding between the liquid crystal display panel and the case, which causes the formation of spots on the liquid crystal display panel.

SUMMARY

By way of introduction only, a liquid crystal display device includes a liquid crystal display panel, a case top covering edges of the liquid crystal display panel, and a compressible conductive member disposed between the case top and the liquid crystal display panel such that the compressible conductive member provides electrical contact between the liquid crystal display panel and the case top. The conductive member is mounted on the inner surface of the case top and makes physical contact with the liquid crystal display panel when the liquid crystal display panel is mounted in the case top. The conductive member, when mounted, may also make physical contact with a support main that supports the liquid crystal panel. The conductive member may be laterally constrained by a peg or other similar extension extending from the support main. The conductive member may be resilient, and may be a plate spring or coil for instance.

In another embodiment, the liquid crystal display device comprises compressible means for grounding the liquid crystal display panel to the case top.

In another embodiment, a portable display device, such as a liquid crystal display device comprises a display panel, a case top covering edges of the display panel, an insulating support main that supports the display panel, and a resilient conductive member contacting the case top and grounding the display panel to the case top.

It is to be understood that both the foregoing general description and the following detailed description of the present invention are exemplary and explanatory and are intended to provide further explanation of the invention as claimed.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE EMBODIMENTS

Figure 1:
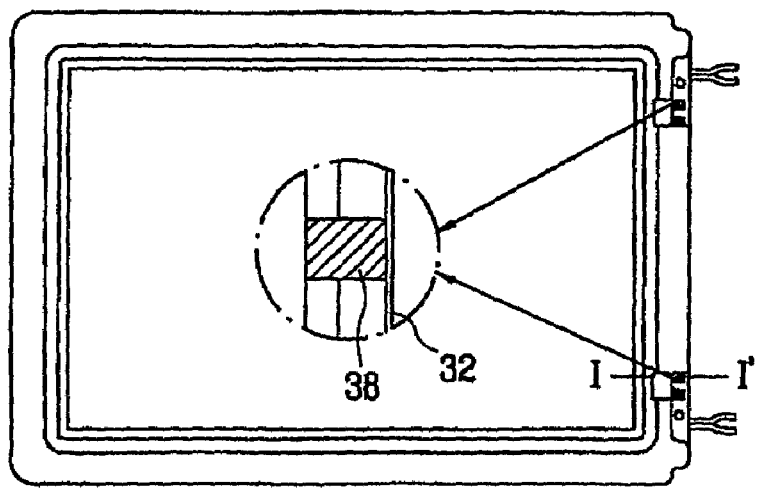
FIG. 1 is a plan view of a related art liquid crystal display device for grounding the liquid crystal display device.
Figure 2:
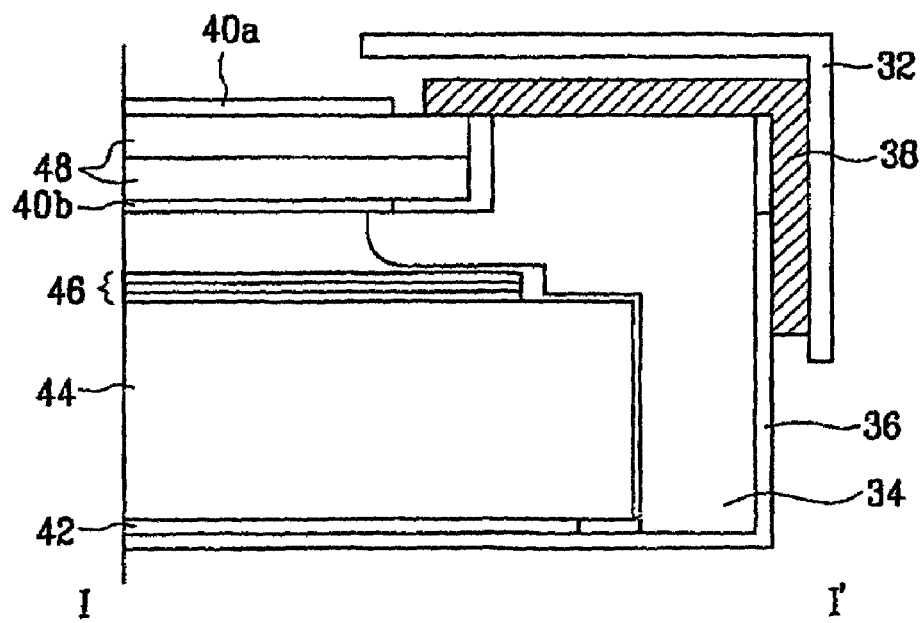
FIG. 2 is a section across a line I-I' in FIG. 1.

Reference will now be made in detail to the embodiments of the present invention, examples of which are illustrated in the accompanying drawings. Wherever possible, the same reference numbers will be used throughout the drawings to refer to the same or like parts.

FIGS. 3-8 illustrate one embodiment of the liquid crystal display device or other portable display device (i.e. a device small enough and light enough to be carried by one person such as that used in a laptop computer). As shown in these figures, the liquid crystal display device contains a liquid crystal panel 120 and a non-conductive support main 112 supporting the liquid crystal panel 120. The liquid crystal panel 120 includes opposing glass substrates 110a and 110b and polarizers 109a and 109b on the outer surfaces of the opposing substrates 110a and 110b. A matrix of liquid crystal cells and switching devices for switching signals to the liquid crystal cells is formed on the lower substrate 110b. The upper substrate 110a contains, for example, a color filter layer, black matrix layer, and/or common electrode.

The liquid crystal display device has a backlight unit that includes a light guiding plate 106, a reflective plate 105, and an optical sheet 107. The light guiding plate 106 guides light present therein throughout an area covering substantially the entire liquid crystal panel 120. A reflective plate 105 is disposed under the light guiding plate 106 for reflecting light exiting the light guiding plate 106 away from the liquid crystal panel 120 back towards the liquid crystal panel 120. The reflective plate 105 contacts the light guiding plate 106, but terminates as shown before reaching the end of the light guiding plate 106. In other embodiments, the reflector 105 can extend to the end of the light guiding plate 106.

An optical sheet 107 is disposed on the light guiding plate 106 between the light guiding plate 106 and the liquid crystal panel 120. The optical sheet 107 contains multiple individual sheets including: adjacent first and second prism sheets 107a and 107b and a diffuser 107c on the first and second prism sheets 107a and 107b. The optical sheet 107 deflects the light from the light guide plate 106 toward the liquid crystal display panel 120. The prism sheets 107a and 107b increase the amount of luminance in the viewing direction while the diffuser 107c spreads light incident thereon to uniformly distribute light impinging on the liquid crystal display panel 120.

The liquid crystal display panel 120, the light guide plate 106, and the optical sheet 107 are joined to minimize light loss and protect the device against external impact. To accomplish this, since the liquid crystal display module having the glass substrates is liable to be broken by an external impact, an LCD case top 104 is provided to surround edges of the liquid crystal display panel 120, the light guide plate 106, and the optical sheet 107. More particularly, the case top 104 joined with the support main 112 to surround edges of the liquid crystal display device.

Figure 10:
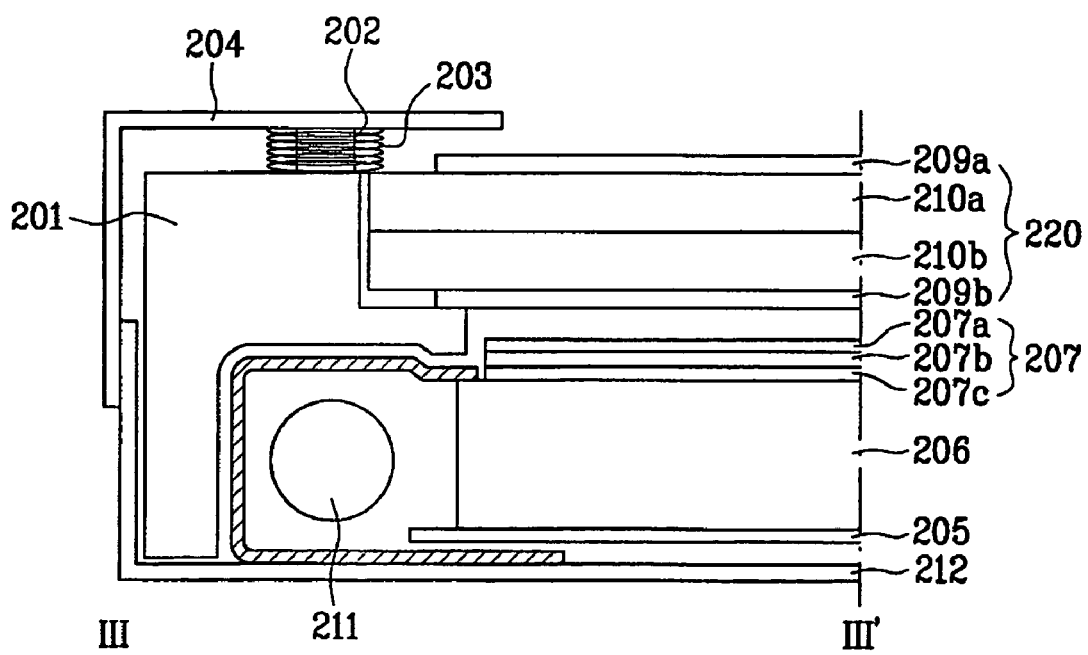
FIG. 10 is a section of a liquid crystal display device across a line II-II in FIG. 9.

The support main 112 is formed from plastic, for example, by molding. The support main 112 has one or more steps in an inside side wall that are configured to retain the liquid crystal panel 120 such that the liquid crystal panel 120 rests on one of the steps. More specifically, as shown the lower polarizer 109b contacts the step of the support main 112, although in a different embodiment, the edge of the lower glass substrate 110b may contact the support main 112. The support main 112 also has one or more steps in which the light guiding plate 106 and optical sheet 107 fits. Although not shown in FIG. 6, a lamp or other light source may be fitted within one of the steps of the support main 112 (for example, as illustrated in FIG. 10).

The case top 104 surrounds the edges of the liquid crystal display device and contacts a case bottom 111. The case top 104 and case bottom 111 are formed from metal, such as stainless steel. The case bottom 111 is attached to the support main 112 by screws or some other means. The case top 104 includes a rectangular frame having a front portion and a side portion perpendicular to the front portion that covers edges of the liquid crystal display panel 120. The side portion of the case top 104 is attached to a side portion of the case bottom 111. The case top 104 is attached to the liquid crystal display device after the liquid crystal device has been assembled. As shown, the case top 104 does not directly contact the liquid crystal panel 120 or the support main 112.

Figure 3:
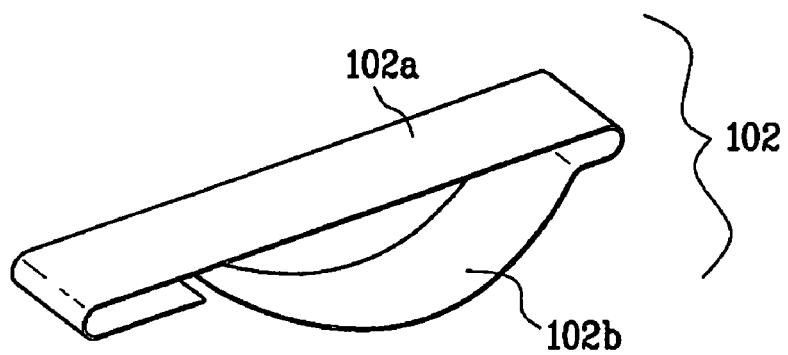
FIG. 3 is a perspective view of a plate spring applied to the liquid crystal display device of an embodiment of the present invention.
Figure 4:
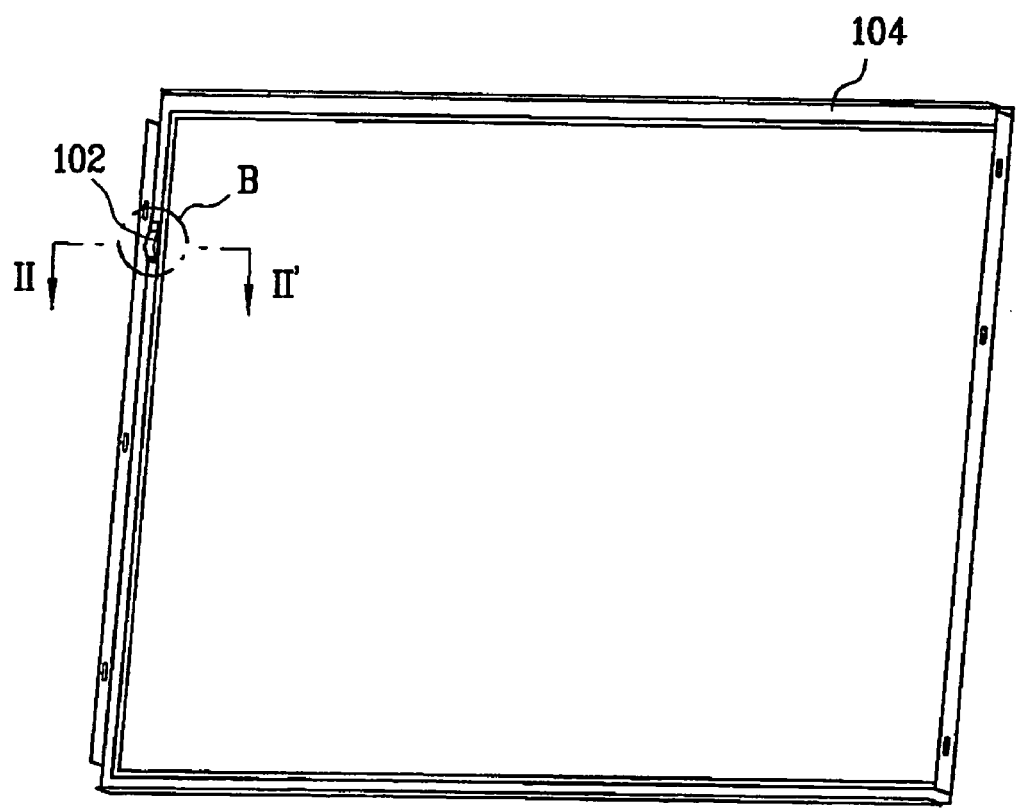
FIG. 4 is a perspective view of a case top having the plate spring in FIG. 4 attached thereto.
Figure 5:
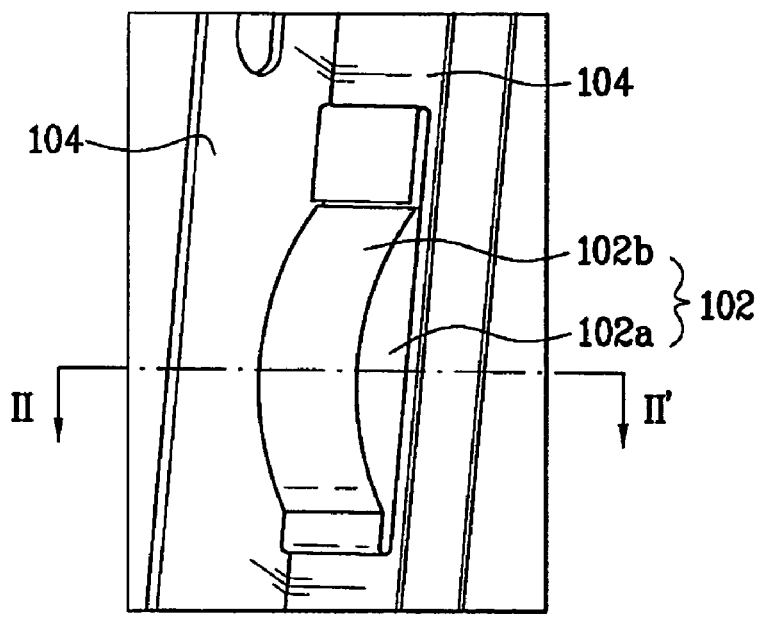
FIG. 5 is an enlarged perspective view of 'B' in FIG. 4.
Figure 6:
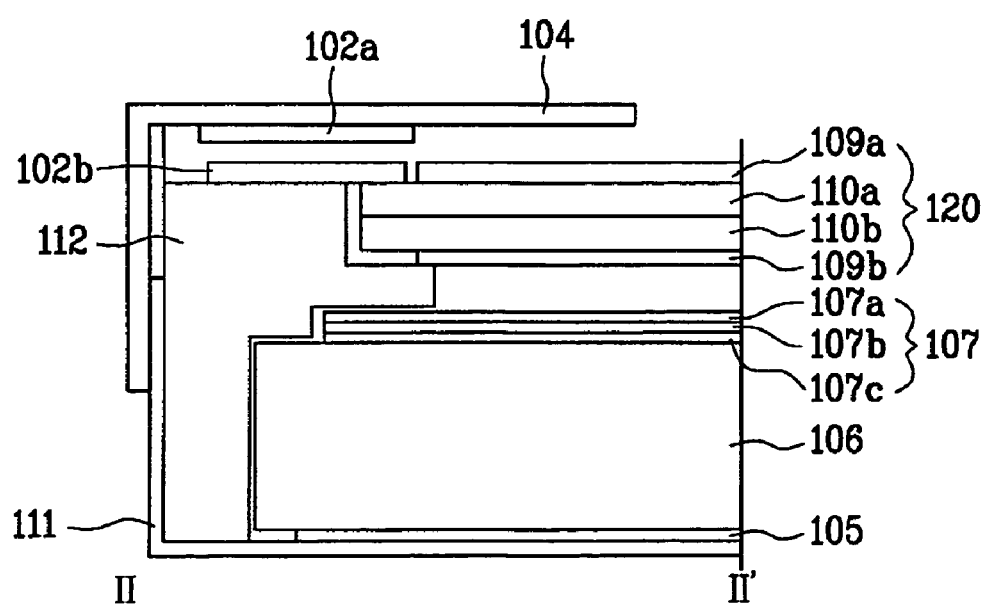
FIG. 6 is a section of a liquid crystal display device of a first embodiment of the present invention across a line II-II in FIG. 5.

A plate spring 102, shown in FIG. 3, formed from a resilient conductive material is attached to a portion of the case top 104 as shown in FIG. 5. More specifically, the plate spring 102 contains a first plate 102a that is substantially flat and a second plate 102b that has a substantial arc. The ends of the first plate 102a and the first plate 102a are connected. The first plate 102a is attached to the top portion of the case top 104 with two sided conductive tape, soldering, a snap fit structure, one or more screws, or some other means. The second plate 102b contacts the support main 112 and the upper glass substrate 110a and may be attached to the upper substrate 110a and/or support main 112 by conductive tape, soldering, etc. . . . or may merely contact the upper substrate 110a and support main 112 without being attached. This arrangement is shown in FIG. 6. Thus, the plate spring 102 grounds the liquid crystal display panel 120 to the case top 104, thereby protecting the liquid crystal display panel 120 from a buildup of static electricity.

Figure 7A:
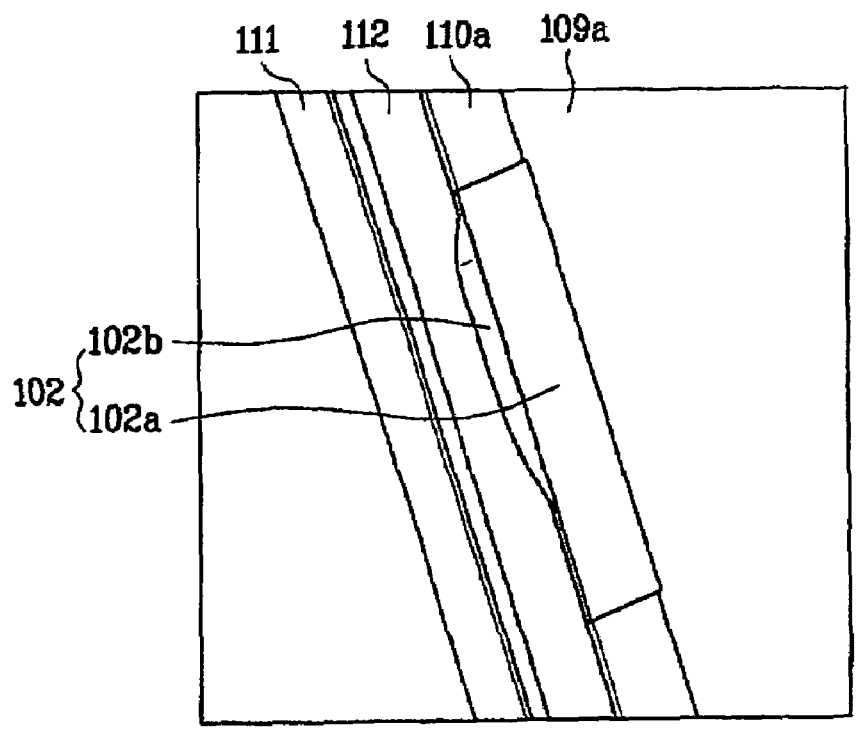
FIGS. 7A and 7B illustrate states of a spring before and after mounting of a liquid crystal display panel on a case top, respectively.
Figure 7B:
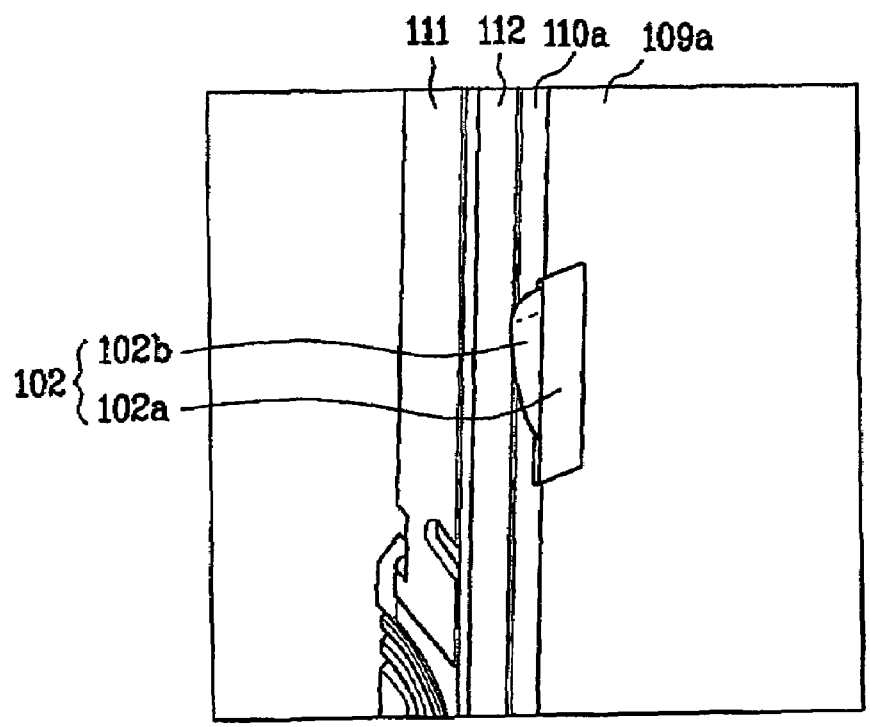
Figure 8A:
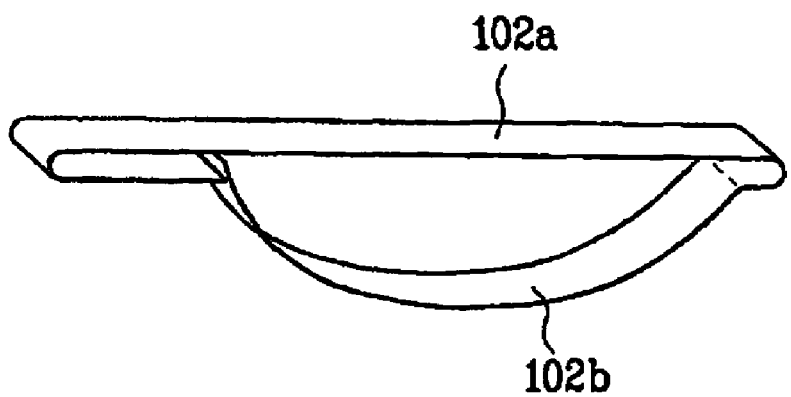
FIGS. 8A and 8B show states of the liquid crystal device before and after mounting of a liquid crystal display panel on a case top, respectively.
Figure 8B:
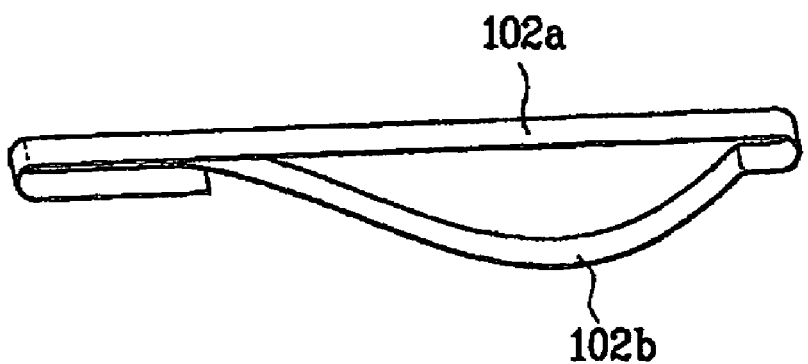

FIGS. 8A and 8B illustrate states of the spring 102 before and after mounting the liquid crystal display panel 120 on the case top 104, respectively, without the other portions of the liquid crystal device or the case top 104. As shown, an end portion of first plate 102a is U-shaped. Before the spring 102 is attached to the case top 104, an end portion of the second plate 102b is positioned such that it is barely, if at all, inside the U-shaped end portion of the first plate 102a. When the spring 102 is attached to the case top 104, the arc-shaped middle portion of the second plate 102b gets pushed down and the end of the second plate 102b extends into the U-shaped end portion of the first plate 102a and provides a stopping point, if desired, for the end of the second plate 102b. The compressed and non-compressed shapes of the spring 102 are also shown in FIGS. 7A and 7B, respectively, which illustrate the spring 102 along with the case bottom 111, support main 112, upper glass substrate 110a, and upper polarizer 109a, without the case top 104 for clarity.

Figure 9:
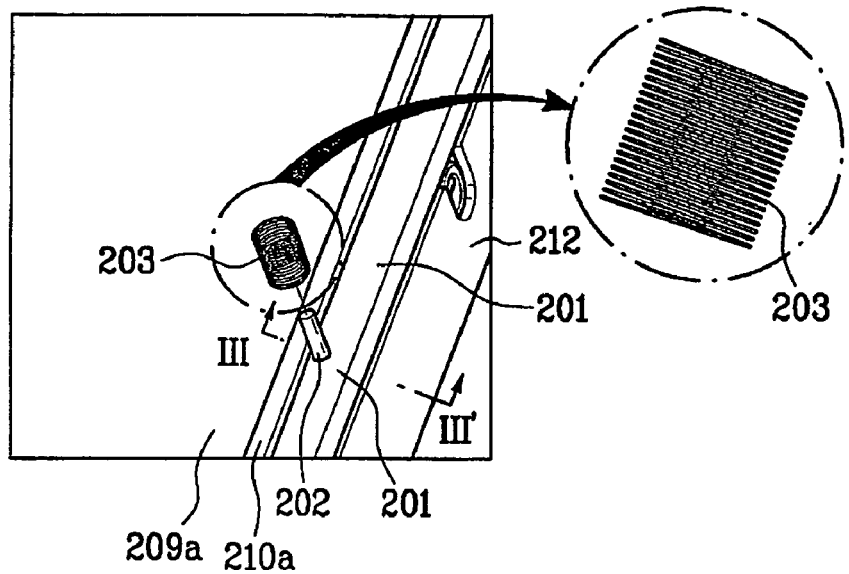
FIG. 9 is a perspective view of a liquid crystal display panel in accordance with another embodiment of the present invention.

FIGS. 9 and 10 illustrate perspective and sectional views of a liquid crystal display panel in accordance with another embodiment. Referring to FIG. 9, similar to the first embodiment, the liquid crystal display device includes a liquid crystal panel 220 and a non-conductive support main 201 supporting the liquid crystal panel 220. The liquid crystal panel 220 includes opposing glass substrates 210a and 210b and polarizers 209a and 209b on the outer surfaces of the opposing substrates 210a and 210b. A matrix of liquid crystal cells and switching devices for switching signals to the liquid crystal cells is formed on the lower substrate 210b. The upper substrate 210a contains, for example, a color filter layer, black matrix layer, and/or common electrode.

The liquid crystal display device has a backlight unit that includes a light source 211, a light guiding plate 206, a reflective plate 205, and an optical sheet 207. The light guiding plate 206 guides light present therein throughout an area covering substantially the entire liquid crystal panel 220. A light source 211 is disposed adjacent to the end of the light guiding plate 206. The light source 211 is surrounded by a reflective housing that reflects light from the light source 211 towards the light guiding plate 206. A reflective plate 205 is disposed under the light guiding plate 206 for reflecting light exiting the light guiding plate 206 away from the liquid crystal panel 220 back towards the liquid crystal panel 220. The reflective plate 205 contacts the light guiding plate 206 and extends beyond the end of the light guiding plate 206. The cover of the light source 211 overlaps the end of light guiding plate 206 on opposing sides of the light guiding plate 206 and consequently overlaps the reflective plate 205. Although not shown, multiple light sources may be present on one or opposing ends of the light guiding plate 206.

An optical sheet 207 is disposed on the light guiding plate 206 between the light guiding plate 206 and the liquid crystal panel 220. The optical sheet 207 contains multiple individual sheets including: adjacent first and second prism sheets 207a and 207b and a diffuser 207c on the first and second prism sheets 207a and 207b. The optical sheet 207 deflects the light from the light guide plate 206 toward the liquid crystal display panel 220.

The liquid crystal display panel 220, the light guide plate 206, and the optical sheet 207 are joined to minimize light loss and protect the device against external impact. To accomplish this, since the liquid crystal display module having the glass substrates is liable to be broken by an external impact, an LCD case top 204 is provided to surround edges of the liquid crystal display panel 220, the light guide plate 206, and the optical sheet 207. More particularly, the case top 204 joined with the support main 201 to surround edges of the liquid crystal display device.

The support main 201 is formed from an insulator such as plastic by molding, for example. The support main 201 has one or more steps in an inside side wall that are configured to retain the liquid crystal panel 220 such that the liquid crystal panel 220 rests on one of the steps. More specifically, as shown the edge of the lower glass substrate 210b contacts the support main 201, although in a different embodiment, the lower polarizer 209b may contact the step of the support main 201. The support main 201 also has one or more steps in which the light source 211 fits. The support main 201 has a peg 202 extending from an upper surface thereof. The peg 202 may be integrally formed with the support main 201 in the molding process, for example, or may be attached later. The light source 211/cover is fastened to the support main 201 with screws, an adhesive, solder or some other fashion.

The case top 204 surrounds the edges of the liquid crystal display device and contacts a case bottom 212. The case top 204 and case bottom 212 are formed from metal, such as stainless steel. The case bottom 212 is attached to the support main 201 by screws or some other means. The case top 204 includes a rectangular frame having a front portion and a side portion perpendicular to the front portion that covers edges of the liquid crystal display panel 220. The side portion of the case top 204 is attached to a side portion of the case bottom 212. The case top 204 is attached to the liquid crystal display device after the liquid crystal device has been assembled. As shown, the case top 204 does not directly contact the liquid crystal panel 220 or the support main 201.

A coil 203 formed from a resilient conductive material is disposed on the peg 202 of the support main 201 and is laterally constrained by the peg 202. The coil 203 is disposed on the peg 202 and the case top 204 is subsequently attached to the liquid crystal device such that the case top 204 contacts the coil 203. More specifically, the upper portion of the coil 203 contacts the case top 204. The coil 203 is large enough such that the lower portion of the coil 203 contacts the support main 201 and the upper glass substrate 210a. Thus, the coil 203 grounds the liquid crystal display panel 220 to the case top 204, thereby protecting the liquid crystal display panel 220 from a buildup of static electricity. Although only one peg 202/coil 203 combination is shown, multiple pegs and coils can be used. Similarly, the coil 203 can have any shape so long as it is large enough to effect contact between the support main, one of the glass substrates, and the case top. The upper and lower portions of the coil 203 may be attached to the case top 204 and/or the support main 201 and/or the upper glass substrate 210a in a manner similar to the plate spring 102 in the first embodiment.

Thus, static electricity generated when mounting a liquid crystal display panel on an inside of a case top is discharged to the case top from the liquid crystal display panel through a spring in a portion of the case top, thereby protecting the liquid crystal display panel from the static electricity. Using a spring or other compressible means permits grounding of the case top and the liquid crystal display panel without the use of conductive tape. This minimizes problems with conductive tape, such as defective attachment of the conductive tape, although conductive tape may be used as an additional grounding path. The compressible means, as above, can be resilient or can be compressible only once (or a limited number of times).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal display panel;
   a case top covering edges of the liquid crystal display panel;
   an insulating support main configured to support the liquid crystal display panel, the insulating support main further including a peg; and a coiled compressible conductive member disposed on the peg and biased between the case top and the liquid crystal display panel to provide electrical contact between the liquid crystal display panel and the case top.

2. The liquid crystal display device as claimed in claim 1, wherein the coiled compressible conductive member contacts the liquid crystal display panel and the case top.

3. The liquid crystal display device as claimed in claim 1, wherein the liquid crystal panel comprises opposing substrates, one of the substrates contacting the support main.

4. The liquid crystal display device as claimed in claim 1, wherein the coiled compressible conductive member is attached to the case top.

5. The liquid crystal display device as claimed in claim 1, wherein the coiled compressible conductive member is attached to the liquid crystal panel.

6. The liquid crystal display device as claimed in claim 1, wherein the compressible conductive member is disengageable from the liquid crystal panel.

7. The liquid crystal display device as claimed in claim 1, wherein the coiled compressible conductive member is resilient.

8. The liquid crystal display device as claimed in claim 1, wherein the coiled compressible conductive member provides physical contact between the liquid crystal display panel and the case top.

9. The liquid crystal display device as claimed in claim 1, wherein the compressible conductive member provides physical contact between the liquid crystal display panel and the support main.

10. The liquid crystal display device as claimed in claim 1, wherein the coiled compressible conductive member is laterally constrained by the support main.

11. The liquid crystal display device as claimed in claim 1, wherein the coiled compressible conductive member is non-adhesive.

* * * * *